United States Patent [19]

Mahara et al.

[11] Patent Number: 5,133,797
[45] Date of Patent: Jul. 28, 1992

[54] COATED GRANULAR FERTILIZER COMPOSITION AND ITS PRODUCTION

[75] Inventors: Akira Mahara; Kihachirou Kodama, both of Hyogo; Tadami Shimooka, Ehime, all of Japan

[73] Assignee: Sumitomo Chemical Company, Ltd., Osaka, Japan

[21] Appl. No.: 333,909

[22] Filed: Apr. 6, 1989

[30] Foreign Application Priority Data

Apr. 6, 1988 [JP] Japan .................. 63-85674

[51] Int. Cl.⁵ .................. C05C 9/00; C05G 3/10; C05G 5/00
[52] U.S. Cl. .................. 71/28; 71/61; 71/62; 71/63; 71/64.02; 71/64.03; 71/64.07; 71/64.11; 71/64.13
[58] Field of Search .................. 71/64.02, 64.03, 64.07, 71/64.11, 64.13, 28, 61–63, 64.12

[56] References Cited

U.S. PATENT DOCUMENTS 4,019,890  4/1977  Fujita et al. .................. 71/64.11

FOREIGN PATENT DOCUMENTS

| 4428457 | 1/1965  | Japan . |
| 543104  | 12/1973 | Japan . |
| 50-99858 | 8/1975 | Japan . |
| 603040  | 1/1978  | Japan . |
| 6037074 | 12/1978 | Japan . |
| 54-97260 | 8/1979 | Japan . |
| 6021952 | 8/1979  | Japan . |
| 55-90495 | 7/1980 | Japan . |
| 0026797 | 3/1981  | Japan .................. 71/64.11 |
| 56-26797 | 3/1981 | Japan . |
| 6018640 | 9/1981  | Japan . |
| 0045188 | 3/1983  | Japan .................. 71/64.07 |
| 815829  | 11/1957 | United Kingdom . |
| 954555  | 10/1960 | United Kingdom . |

OTHER PUBLICATIONS

Chem. Abs. 94: 190939z.

*Primary Examiner*—Ferris Lander
*Attorney, Agent, or Firm*—Birch, Stewart, Kolasch & Birch

[57] ABSTRACT

A coated granular fertilizer composition comprising fertilizer granules, of which each particle being coated with a copolymer comprising units of vinyl chloride and units of ethylene in a weight proportion of about 50:50 to 90:10 with units of at least one functional monomer chosen from acrylamide, methacrylamide, N-methylolacrylamide, N-butoxymethylacrylamide, acrylic acid, glycidyl methacrylate and hydroxyethyl acrylate in an amount of not more than about 10% by weight based on the total amount of vinyl chloride units and ethylene units in an amount of about 5 to 40% by weight based on the weight of the granule.

13 Claims, 1 Drawing Sheet

COATED GRANULAR FERTILIZER COMPOSITION AND ITS PRODUCTION

The present invention relates to a coated granular fertilizer composition and its production. More particularly, it relates to a coated granular fertilizer composition having a slow-releasing property, thereby making it possible to timely supply nutrients to cultivating plants on their demand thereto.

Aiming at fertilization of high efficiency, various attempts have been made for delaying the immediate action of chemical fertilizers. A typical example of such attempts is to coat a fertilizer composition in a granular state with a resinous material for slow exertion of its releasing property. For instance, a solution of a resinous material in an organic solvent is applied to fertilizer granules for coating. As the resinous material, there are usable polyolefin or ethylene/vinyl acetate copolymer (JP-B-44-28457, JP-B-54-3104, JP-B-60-21952 and JP-B-60-37074), a mixture of polyolefin, polyvinylidene chloride and ethylene/vinyl acetate copolymer with an inorganic carrier (JP-B-60-3040), a styrenated alkyd resin or a phenol resin (British Pat. No. 954,555), a styrene resin, a vinyl chloride resin or a vinylidene chloride resin (British Pat. No. 815,829), etc. Further, for instance, a resin emulsion is applied to fertilizer granules for coating. As the resin emulsion, there may be used polyethylene emulsion, polyvinylidene chloride emulsion, ethylene/vinylidene chloride copolymer emulsion, ethylene-vinyl acetate copolymer emulsion, acryl resin emulsion, etc. (JP-B-60-18640).

On the use of a resinous material solution in an organic solvent, however, care must be taken on the toxicity and inflammability of the organic solvent. In addition, blocking is apt to be produced on the coating. On the use of a resin emulsion, the coating film therefrom is inferior to that from said resinous material solution in various physical properties such as strength and gas permeability. Further, production of the fertilizer granules having a coating film sufficiently controlled in releasing property is difficult, because the fertilizer components are soluble in water and therefore in the resin emulsion. Furthermore, the entire coating of the fertilizer granules is prevented by blocking due to the stringiness of the resin emulsion.

For overcoming the above drawbacks in conventional techniques, an extensive study has been made. As the result, it has been found that coating of fertilizer granules with a certain specific compolymer comprising units of vinyl chloride and units of ethylene with units of at least one functional monomer chosen from acrylamide, methacrylamide, N-methylolacrylamide, N-butoxymethylacrylamide, acrylic acid, glycidyl methacrylate and hydroxyethyl acrylate can afford coated fertilizer granules having a slow-releasing property so that the fertilizer components are properly released in water with the growth of plants under cultivation. Advantageously, no blocking is produced during the coating process. This invention is based on the above finding.

Figure 1:
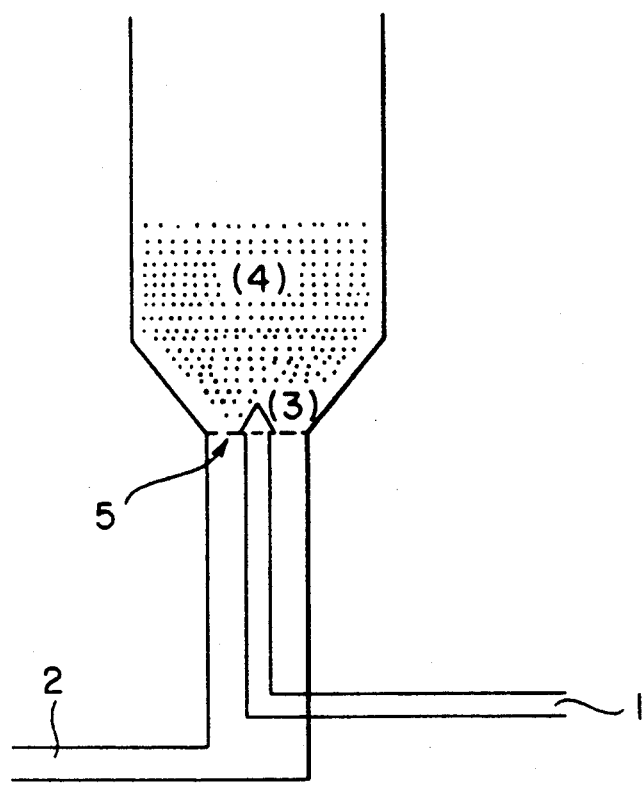
FIG. 1 shows a coating device which may be used in accordance with the present invention.

The coated granular fertilizer composition of the invention comprises fertilizer granules, of which each granule is coated with a copolymer comprising units of vinyl chloride and units of ethylene in a weight proportion of about 50:50 to 90:10 with units of at least one functional monomer chosen from acrylamide, methacrylamide, N-methylolacrylamide, N-butoxymethylacrylamide, acrylic acid, glycidyl methacrylate and hydroxyethyl acrylate in an amount of not more than about 10% by weight based on the total amount of vinyl chloride units and ethylene units (hereinafter referred to as "a vinyl chloride/ethylene copolymer") in an amount of about 5 to 40% by weight based on the weight of the granule.

For preparation of the coated granular fertilizer composition, an emulsion comprising the vinyl chloride/ethylene copolymer is applied onto fertilizer granules by spraying at a temperature of about 40° to 50° C. for coating, followed by drying with hot air. When desired, an anti-blocking agent may be applied by spraying onto the thus coated fertilizer granules in an amount of about 0.05 to 2% by weight based on the weight of the vinyl chloride/ethylene copolymer. The resulting granules are then heated at a temperature of about 80° to 130° C. for aging.

Any particular limitation is not present on the fertilizer granules to be coated according to the invention. Such fertilizer granules may be the ones, for instance, made of chemical fertilizers (e.g. urea, ammonium sulfate, ammonium chloride, ammonium nitrate, potassium chloride, potassium sulfate, potassium nitrate, sodium nitrate, ammonium phosphate, potassium phosphate, calcium phosphate) and shaped in spheres or the like having a particle size of about 2 to 10 mm.

The emulsion usable for coating is normally in an oil-in-water type and may be the one obtained by emulsion polymerization of a mixture of monomer components, the one obtained by dissolving a polymeric resin in a solvent (e.g. benzene, toluene, xylene, heptane, octane, ethylcyclohexane, trichloroethylene, tetrachloroethylene, methylchloroform, carbon tetrachloride, tetrachloroethane, tetrahydrofuran) and admixing the same with water in the presence of a surfactant (e.g. sodium salts of dialkylsulfosuccinic esters, sodium salts of higher alcohol sulfuric esters, sodium dodecylbenzenesulfonate, alkylpicolinium chloride, ammonium salts of polyoxyethylene alkyl phenyl ether sulfates) or the like. The solid content of such emulsion is usually about 10 to 60% by weight.

The polymer component in the emulsion is the vinyl chloride/ethylene copolymer as defined above. When the ethylene unit content in the copolymer is more than about 50% by weight, blocking is apt to produce among the fertilizer granules on coating, and production of the coated granular fertilizer composition is thus difficult. When the vinyl chloride unit content is more than 90% by weight, the shrinking property of the coating film is increased so that the perfect coating is hardly made and the control of the releasing property becomes difficult. The functional monomer is used to provide the vinyl chloride/ethylene copolymer with a hydrophilic property, and therefore the permeability of the coating film resulting therefrom to water or an aqueous solution of the fertilizer is better than that of the coating film resulting from a vinyl chloride/ethylene copolymer not comprising units of the functional monomer. The content of the functional monomer units in the vinyl chloride/ethylene copolymer is not more than about 10% by weight, preferably from about 1 to 10% by weight. When the content is more than about 10% by weight, the water resistance of the coating film is much deteriorated so that the fertilizer is released too quickly. If necessary, two or more kinds of the vinyl chloride/ethylene copolymer different in the composition may be used in combination for assuring better film-forming property and anti-blocking property.

The amount of the vinyl chloride/ethylene copolymer to be applied as the coating material onto the granules may be from about 5 to 40% by weight based on the weight of the granules. When the amount is less than about 5% by weight, sufficient coating can not be achieved, and the coating film may have pinholes. As the result, the releasing rate is not well controlled. When it is more than 40% by weight, the releasing rate is not much delayed and disadvantageous from the economical viewpoint.

On preparation of the coated granular fertilizer composition of the invention, coating may be carried out by the use of a conventional coating apparatus such as a coating material spray apparatus (e.g. rotary coating pan, fluidized bed granulator), a granular fertilizer fluidizing apparatus equipped with a hot wind supplier as shown in FIG. 1 of the accompanying drawing or the like.

Spraying and drying are to be carried out at a temperature of about 40° to 50° C. When the temperature is lower than about 40° C., a long time is needed for drying so that the fertilizer components are dissolved in the emulsion, whereby the coating film as formed can not have a desired releasing property. When higher than about 50° C., bloking may be undesirably produced.

After drying, an anti-blocking agent is optionally sprayed onto the coated fertilizer granules for the purpose of prevention of blocking, which may otherwise occur on the subsequent heating for aging. Examples of the anti-blocking agent are agalmatolite, talc, calcium carbonate, silica, etc., and it may be used in such a small amount as about 0.05 to 2% by weight on the amount of the vinyl chloride/ethylene copolymer.

Heating for aging is to be effected at a temperature of about 80° to 130° C. The temperature lower than about 80° C. can not sufficiently accomplish aging, while that higher than about 130° C. does not produce any increase in aging effect and unfavorably approaches to the melting point of any fertilizer component (e.g. urea).

The coating operation as above explained may be repeated (e.g. in several times) when desired, particularly when a large amount of the vinyl chloride/ethylene copolymer is to be coated.

When desired, the fertilizer granules may be incorporated or admixed with any other optional component such as a fungicide, a herbicide, an insecticide, a coloring agent, a surfactant for release control or a water-insoluble inorganic material insofar the object of the invention can be maintained.

The coated granular fertilizer composition of the invention can release the fertilizer component over a long period of time depending upon the demand by the plants such as rice plants under cultivation so that better crop yields are obtainable in comparison with conventional fertilizer granules under appropriate weather conditions.

Practical and presently preferred embodiments of the invention are illustratively shown in the following examples wherein % is by weight unless otherwise indicated.

EXAMPLES 1 TO 3 AND COMPARATIVE EXAMPLE 1

Using a coating device as shown in FIG. 1 of the accompanying drawing wherein (1) is a spray air conduit, (2) is a hot air conduit, (3) is a spray nozzle, (4) is fertilizer granules comprising urea and (5) is a fertilizer supporting metal net, fertilizer granules were coated under the following condition:

| | |
|---|---|
| Fertilizer granules: | urea (2 to 4 mmø) |
| Amount of fertilizer granules: | 1000 g |
| Temperature at spraying and drying: | 43–45° C. |
| Temperature for aging: | 82° C. (Example 1) |
| | 100° C. (Example 2) |
| | 130° C. (Example 3) |
| | 75° C. (Comparative Example 1) |
| Blown air amount: | 130 m²/hr |
| Air pressure in nozzle: | 1.8 kg/cm² |
| Amount of coating material: | 17% to fertilizer granules |
| Anti-blocking agent (talc): | 0.2% to coating material |

Namely, the fertilizer granules (4) were charged in the coating device on the metal net (5) and fluidized by blowing hot air therein through the hot air conduit (2) at a pre-determined rate. An emulsion comprising the vinyl chloride/ethylene copolymer (a copolymer consisting of ethylene units (21.1%), vinyl chloride units (75.0%), acrylamide units (1.9%) and N-methylolacrylamide units (1.9%)) was sent through the spray air conduit 1 and sprayed from the spray nozzle (3) to the fertilizer granules at a temperature of 43° to 45° C. for 60 minutes with immediate drying. Talc (0.2%) was sprayed through the hot air conduit (2) thereto, and the temperature was raised to 82° C. (Example 1), 100° C. (Example 2), 130° C. (Example 3) and 75° C. (Comparative Example 1) for 45 minutes for aging. The thus coated fertilizer granules were subjected to measurement of the releasing rate into water at 30° C., and the results are shown in Table 1. In case of Example 1, the change of the releasing rate into water at 30° C. for 70 days is shown in Table 2.

TABLE 1

| | Releasing rate (%) | |
|---|---|---|
| | After 1 day | After 7 days |
| Example 1 | 0.6 | 2.8 |
| Example 2 | 0.3 | 0.9 |
| Example 3 | 0.3 | 0.9 |
| Comparative Example 1 | 44.7 | 67.1 |

TABLE 2

| Days elapsed | Releasing rate (%) |
|---|---|
| 1 | 0.6 |
| 7 | 2.8 |
| 10 | 9.8 |
| 20 | 20.2 |
| 30 | 36.8 |
| 50 | 68.7 |
| 70 | 77.5 |

EXAMPLE 4

In the same manner as in Example 1, a chemical fertilizer comprising N (10%), $P_2O_5$ (14%) and K (13%) in a granular state ("EBISU" ® manufactured by Sumitomo Chemical Co., Ltd.) was coated to give coated fertilizer granules having a releasing rate into water at 30° C. of 1.7% after one day and of 3.4% after one week.

COMPARATIVE EXAMPLE 2

Using the same coating device as shown in FIG. 1, an emulsion comprising an ethylene/vinyl acetate copolymer consisting of ethylene units (5%), vinyl acetate units (42%) and vinyl chloride units (53%) ("SUMIKAFLEX 830" ® manufactured by Sumitomo Chemical Co., Ltd.), an emulsion comprising an ethylene/vinyl acetate copolymer consisting of ethylene units (3%), vinyl acetate units (36%) and vinyl chloride units (61%) ("SUMIKAFLEX 850" ® manufactured by Sumitomo Chemical Co., Ltd.), an emulsion comprising a vinylidene chloride polymer emulsion ("L-502" manufactured by Asahi Chemical Industries, Ltd.) or an emulsion comprising a vinylidene chloride polymer emulsion ("L-511" manufactured by Asahi Chemical Industries, Ltd.) was sprayed on granules of urea having a particle size of 2 to 4 mm under the same condition as in Example 1 for coating. However, complete coating could not be achieved in any case because of production of blocking during the operation.

EXAMPLE 5

In the same manner as in Example 1, an emulsion comprising a vinyl chloride/ethylene copolymer (consisting of ethylene units (21.2%), vinyl chloride units (75.0%), acrylamide units (1.9%) and N-methylolacrylamide units (1.9%)) and a vinyl chloride/ethylene copolymer (consisting of ethylene units (18.3%), vinyl chloride (77.9%), acrylamide (1.9%) and N-methylolacrylamide (1.9%)) in a weight proportion of 3:2 was sprayed on granules of urea for coating to give coated granules having a releasing rate into water at 30° C. of 1.3% after ond day and of 7.9% after one week.

EXAMPLE 6

In the same manner as in Example 1, the same emulsion as in Example 5 but divided into half was sprayed on granules of urea for coating, and the coating operation was repeated twice. The obtained coated granules had a releasing rate into water at 30° C. of 0.8% after one day and of 2.7% after one week.

As understood from the above, this invention can accomplish the coating of fertilizer granules without producing blocking during the coating operation and afford coated fertilizer granules having a releasing property into water suitable for supplying nourishment to plants under cultivation depending on its growth.

What is claimed is:

1. A coated granular fertilizer composition consisting essentially of fertilizer granules coated with a copolymer in an amount of about 5 to 40% by weight based on the weight of the granules, said copolymer comprising units of vinyl chloride and units of ethylene in a weight proportion of about 50:50 to 90:10 with 2) units of at least one functional monomer selected from the group consisting of acrylamide, methacrylamide, N-methylolacrylamide, N-butoxymethylacrylamide, acrylic acid, glycidyl methacrylate and hydroxyethyl acrylate in an amount of not more than about 10% by weight based on the total amount of said vinyl chloride units and ethylene units.

2. The composition according to claim 1, wherein the granules before coating have a particle size of 2 to 10 mm.

3. The composition according to claim 1, wherein the granules comprise at least one chemical fertilizer selected from the group consisting of urea, ammonium sulfate, ammonium chloride, ammonium nitrate, potassium chloride, potassium sulfate, potassium nitrate, sodium nitrate, ammonium phosphate, potassium phosphate and calcium phosphate.

4. The composition according to claim 1, wherein the coated fertilizer granules further include an anti-blocking agent in an amount of about 0.05 to 2% by weight on the basis of the copolymer as the coating material and wherein said anti-blocking agent is sprayed on said granules after drying and before aging.

5. A process for preparing a coated granular fertilizer composition which comprises the steps of:
applying an emulsion consisting essentially of a copolymer that comprises (1) units of vinyl chloride and units of ethylene in a weight proportion of about 50:50 to 90:10 with (2) units of at least one functional monomer selected from the group consisting of acrylamide, methacrylamide, N-methylolacrylamide, N-butoxymethylacrylamide, acrylic acid, glycidyl methacrylate and hydroxyethyl acrylate in an amount of not more than about 10% by weight based on the total amount of said vinyl chloride units and ethylene units, onto fertilizer granules in an amount of about 5 to 40% by weight based on the weight of the fertilizer granules by spraying the copolymer thereon at a temperature of 40° C. to 50° C.;
applying hot air of the same temperature as above to the coated granules for drying; and
heating the resultant coated granules for aging to produce said composition.

6. The process according to claim 5, wherein an anti-blocking agent is applied to the coated granules by spraying after drying and before aging in an amount of 0.05 to 2% by weight on the basis of the copolymer as the coating material.

7. The process according to claim 6, wherein the anti-blocking agent is selected from the group consisting of agalmatolite, talc, calcium carbonate and silica.

8. The process according to claim 5, wherein the heating for aging is effected at a temperature of about 80° to about 130° C.

9. The process according to claim 5, wherein the granules before coating have a particle size of 2 to 10 mm.

10. A coated granular fertilizer composition consisting essentially of fertilizer granules coated with a copolymer in an amount of about 5 to 40% by weight based on the weight of the granules, said copolymer comprising (1) units of vinyl chloride and units of ethylene in a weight proportion of about 50:50 to 90:10 with (2) units of at least one functional monomer selected from the group consisting of acrylamide, methacrylamide, N-methylolacrylamide, N-butoxymethylacrylamide, acrylic acid, glycidyl methacrylate and hydroxyethyl acrylate in an amount of not more than about 10% by weight based on the total amount of said vinyl chloride units and ethylene units; wherein the granules comprise at least one chemical fertilizer selected from the group consisting of urea, ammonium sulfate, ammonium chloride, ammonium nitrate, potassium chloride, potassium sulfate, potassium nitrate, sodium nitrate, ammonium phosphate, potassium phosphate and calcium phosphate; and wherein the coated fertilizer granules further comprise an anti-blocking agent in an amount of about 0.05 to 2% by weight on the basis of the copolymer as the coating material and wherein said anti-blocking agent is sprayed on said granules after drying and before aging.

11. The composition according to claim 10, wherein the anti-blocking agent is selected from the group consisting of agalmatolite, talc, calcium carbonate and silica.

12. A process for preparing a coated granular fertilizer composition which comprises the steps of:

applying an emulsion consisting essentially of a copolymer that comprises (1) units of vinyl chloride and units of ethylene in a weight proportion of about 50:50 to 90:10 with (2) units of at least one functional monomer selected from the group consisting of acrylamide, methacrylamide, N-methylolacrylamide, N-butoxymethylacrylamide, acrylic acid, glycidyl methacrylate and hydroxyethyl acrylate in an amount of not more than about 10% by weight based on the total amount of said vinyl chloride units and ethylene units, onto fertilizer granules in an amount of about 5 to 40% by weight based on the weight of the fertilizer granules by spraying the copolymer thereon at a temperature of 40° to 50° C.;

applying hot air of the same temperature as above to the coated granules for drying; and heating the resultant coated granules at a temperature of about 80° to 130° C. for aging to produce said composition, wherein an anti-blocking agent is applied to the coated granules by spraying after drying and before aging in an amount of 0.05 to 2% by weight on the basis of the copolymer as the coating material.

13. The process according to claim 12, wherein the anti-clocking agent is selected from the group consisting of agalmatolite, talc, calcium carbonate and silica.

* * * * *